(12) United States Patent
Yamaguchi

(10) Patent No.: US 7,525,596 B2
(45) Date of Patent: Apr. 28, 2009

(54) CAMERA INCLUDING FIRST, SECOND AND THIRD EXTERIOR MEMBERS DEFINING THE EXTERIOR THEREOF

(75) Inventor: Toshinobu Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 644 days.

(21) Appl. No.: 10/935,093

(22) Filed: Sep. 8, 2004

(65) Prior Publication Data

US 2005/0057685 A1    Mar. 17, 2005

(30) Foreign Application Priority Data

Sep. 11, 2003    (JP) .............................. 2003-319997

(51) Int. Cl.
*H04N 5/225* (2006.01)
(52) U.S. Cl. ..................................... 348/375
(58) Field of Classification Search ................ 348/375, 348/373, 345, 376; 396/27, 26, 28, 29
See application file for complete search history.

(56) References Cited

U.S. PATENT DOCUMENTS

| 4,522,478 | A | * | 6/1985 | Kando et al. ................. 396/448 |
| 5,600,391 | A | * | 2/1997 | VanDeMoere et al. .......... 396/6 |
| 5,758,200 | A | * | 5/1998 | Inoue et al. .................... 396/25 |
| 5,897,225 | A | * | 4/1999 | Rieger et al. ................... 396/29 |
| 5,907,721 | A | * | 5/1999 | Schelling et al. .............. 396/27 |
| 6,115,559 | A | * | 9/2000 | Balling et al. ................. 396/541 |
| 6,324,349 | B2 | * | 11/2001 | Nakano et al. ................ 396/535 |
| 6,574,434 | B2 | * | 6/2003 | Matsuoto et al. .............. 396/29 |
| 6,610,937 | B2 | | 8/2003 | Yamaguchi ..................... 200/4 |
| 6,721,014 | B1 | | 4/2004 | Ariga .......................... 348/374 |
| 7,060,921 | B2 | * | 6/2006 | Kubo ....................... 200/302.1 |
| 2001/0051045 | A1 | * | 12/2001 | Kobayashi et al. .......... 396/178 |
| 2002/0159774 | A1 | * | 10/2002 | Koyama et al. ............. 396/505 |
| 2003/0071975 | A1 | * | 4/2003 | Fujimori et al. ............... 353/31 |
| 2003/0095374 | A1 | * | 5/2003 | Richardson .................. 361/681 |
| 2005/0024526 | A1 | * | 2/2005 | Wang ......................... 348/373 |

FOREIGN PATENT DOCUMENTS

| JP | 11-261858 A | 9/1999 |
| JP | 11-331667 | 11/1999 |
| JP | 2001-274585 | 10/2001 |
| JP | 2003-023262 | 1/2003 |

OTHER PUBLICATIONS

Chinese Office Action issued in Application No. 200410077137.3.

* cited by examiner

*Primary Examiner*—Tuan V Ho
*Assistant Examiner*—Kent Wang
(74) *Attorney, Agent, or Firm*—Fitzpatrick, Cella, Harper & Scinto

(57) ABSTRACT

Camera includes a first, second and third exterior members for covering an inner assembly. The first and second exterior members cover a front face, a rear face, a top face, a bottom face and a side face of the inner assembly. The side face is closer to a center of gravity of the inner assembly. The third exterior member extends along the top face, the bottom face and the side face to cover mated portions of the first and second exterior members and does not cover another side of the inner assembly, away from the center of gravity.

2 Claims, 5 Drawing Sheets

CAMERA INCLUDING FIRST, SECOND AND THIRD EXTERIOR MEMBERS DEFINING THE EXTERIOR THEREOF

BACKGROUND OF THE INVENTION

1. Field of the Invention

The present invention relates to electronic apparatus such as a camera or the like.

2. Description of Related Art

Conventional cameras are designed so that internal structures are covered by a front cover and a rear cover as disclosed in Japanese Patent Application Laid-Open No. H11(1999)-261858.

In conventional cameras, it is frequently carried out to insert a strap through a strap ring and hold a camera via the strap. When a user releases the strap and the strap slides off under the state where the camera is held by griping the strap, the camera falls with the electric flash unit side facing the ground surface. In this case, the camera strikes against the ground surface or the like, so that the boundary between the front cover and the rear cover at the electric flash unit side may be opened or the electric flash unit may malfunction.

SUMMARY OF THE INVENTION

The present invention has an object to provide electronic apparatus which is hardly broken even when it suffers a shock due to falling or the like.

According to one aspect of the present invention, an electronic apparatus comprising an image-taking unit including an image-pickup element which takes an image of an object and a lens which provides the image on the image-pickup element, a first exterior member having at least front face, rear face, top face, bottom face, first and second sides, for covering the image-taking unit, the first exterior member including a front exterior member assembled from the front of the image-taking unit and a rear exterior member assembled from the back of the image-taking unit, and a second exterior member provided so as to cover the connection between the front exterior member and rear exterior member on the first side, top face and bottom face, and formed as one. The image-taking unit is provided on the first side of the electronic apparatus. The second exterior member has a first face locating opposite the first side, a second face locating opposite the top face and a third face locating opposite the bottom face.

The feature of the electronic apparatus of the present invention will be clarified through description of preferred embodiments described hereunder with reference to the accompanying drawing.

DETAILED DESCRIPTION OF THE PREFERRED EMBODIMENTS

Embodiment 1

Figure 1:
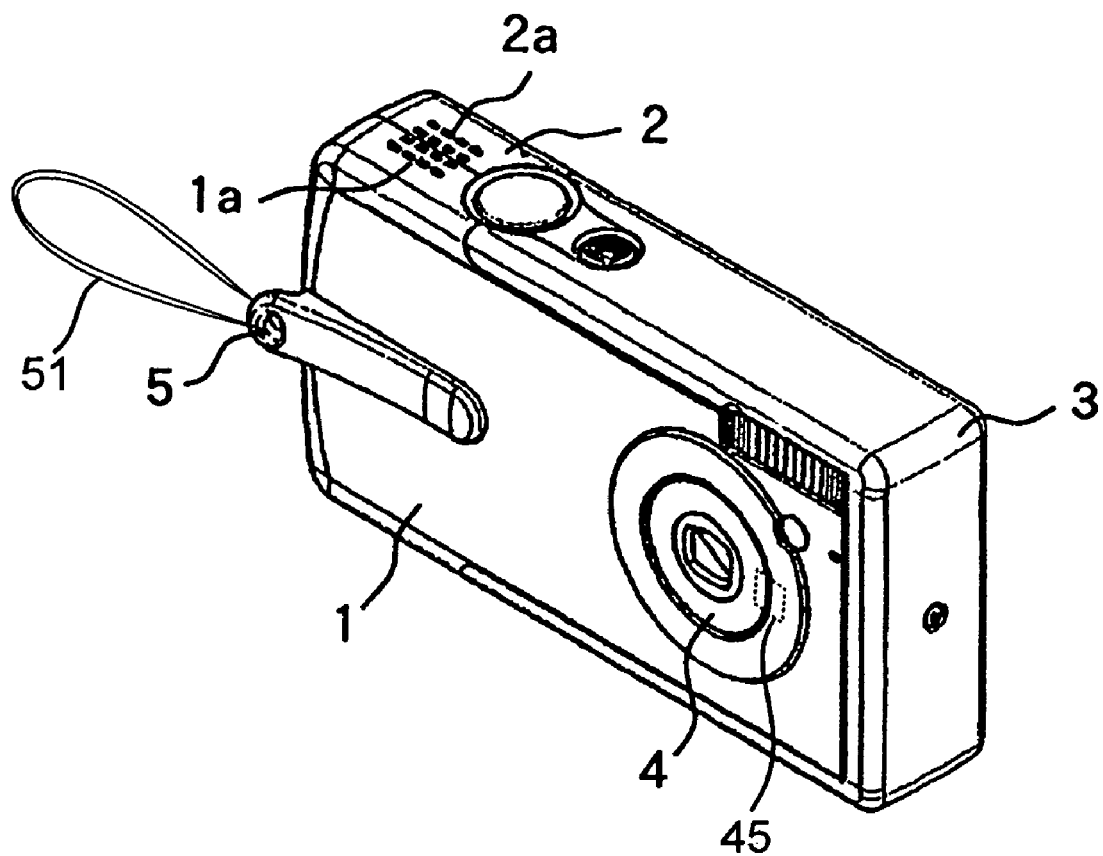
FIG. 1 is a perspective view showing the outward appearance of a camera according to a first embodiment of the present invention.
Figure 2:
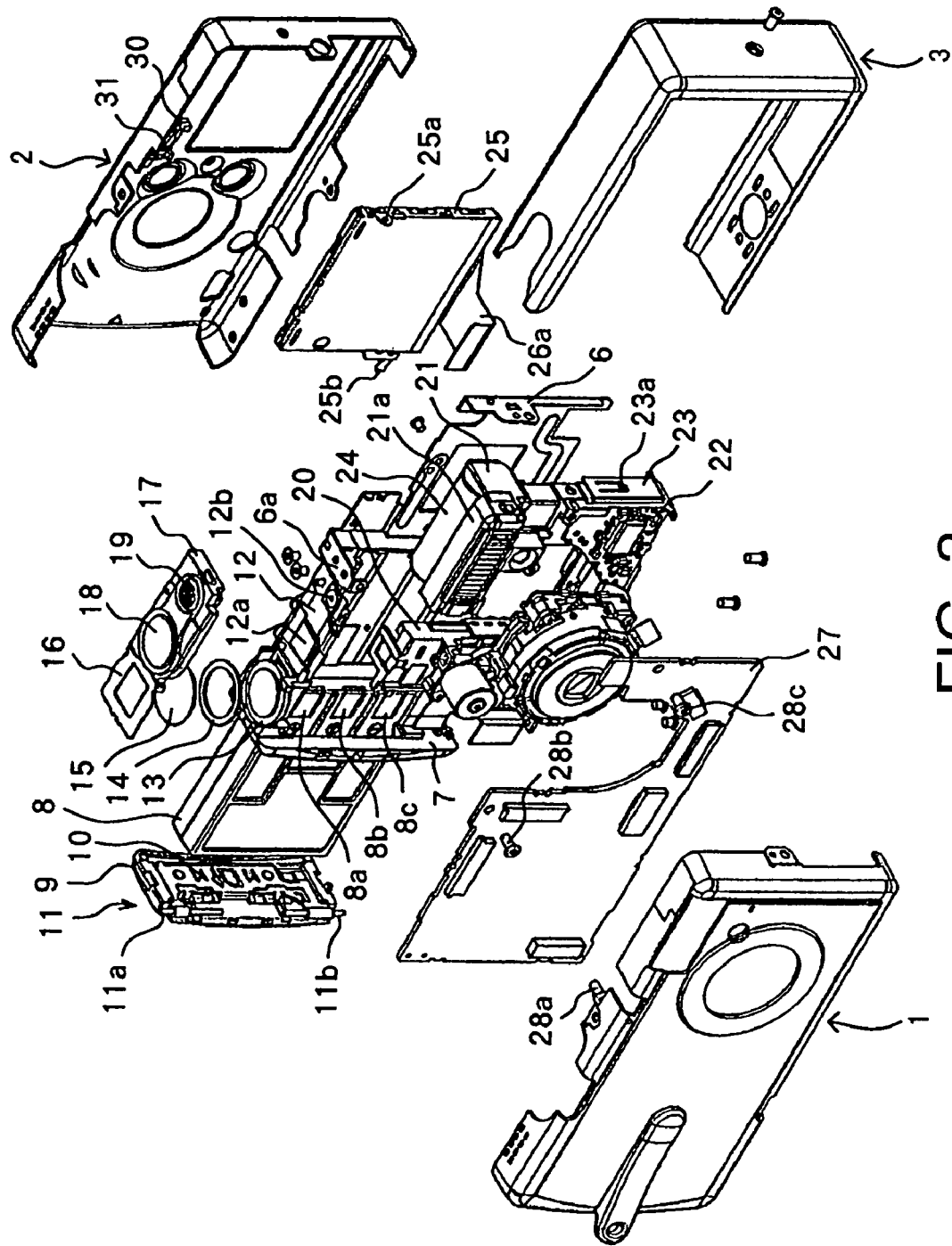
FIG. 2 is an exploded view of the camera of the first embodiment of the present invention.
Figure 3:
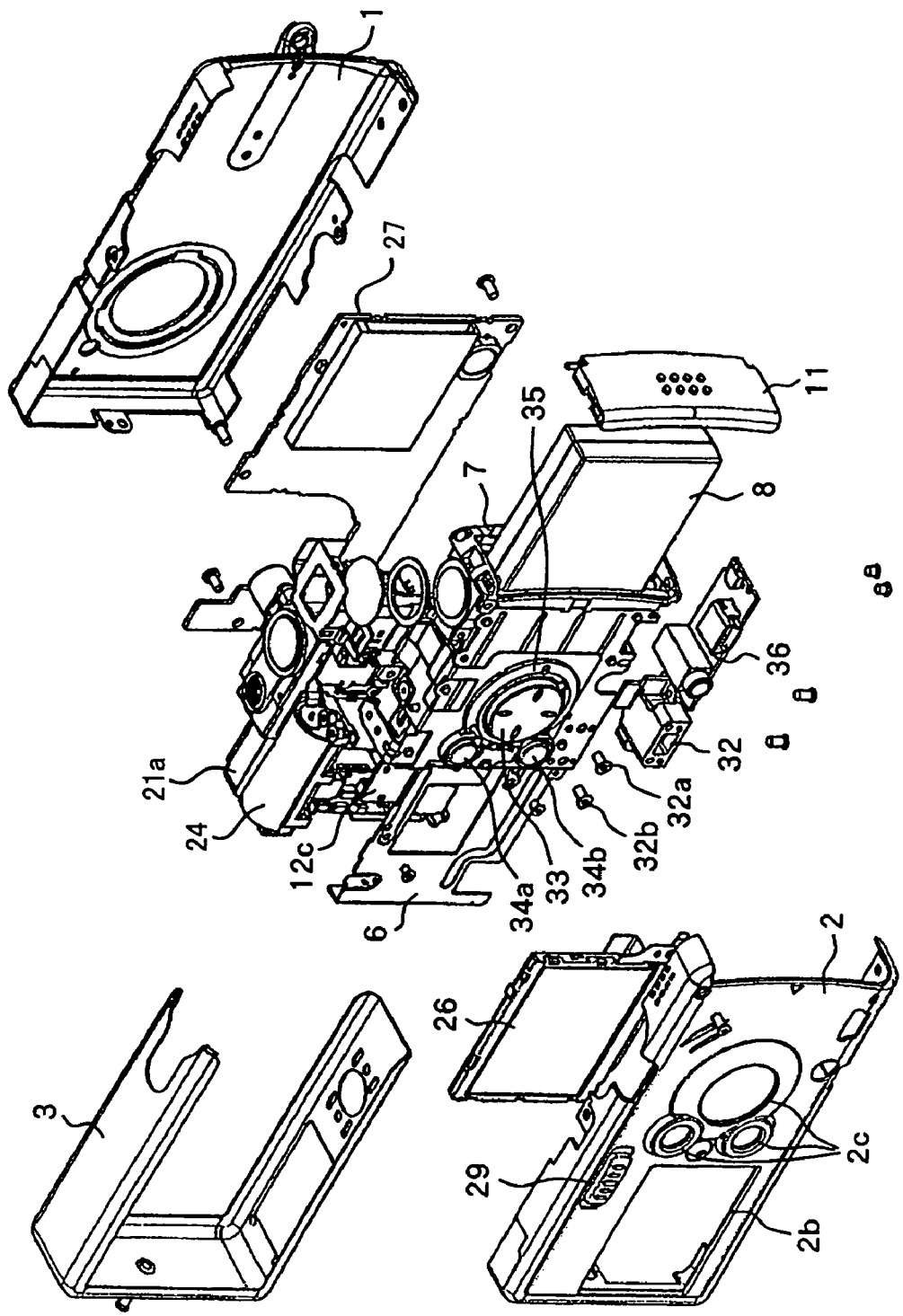
FIG. 3 is an exploded view of the camera of the first embodiment of the present invention.

FIG. 1 is a perspective view showing the outward appearance of a camera (electronic apparatus) according to an embodiment 1 of the present invention. FIG. 2 is an exploded perspective view showing the camera when the camera is viewed from the front side, and FIG. 3 is an exploded perspective view of the camera when the camera is viewed from the back side.

In these figures, Reference Numeral 1 denotes a front cover for covering the front side of the camera (containing parts of the upper, lower, right and left side surfaces of the camera), and Reference Numeral 2 denotes a rear cover for covering the back side of the camera (containing parts of the upper, lower, right and left side surfaces of the camera). These covers 1 and 2 are formed of thin plates of stainless steel or the like.

Reference Numeral 3 denotes a side cover, and it is mounted to the front cover 1 and the rear cover 2 so as to cover parts of the front cover 1 and the rear cover 2, that is, one side of the camera body (the side surface at the right side when viewing the front of the camera), and parts of the upper and lower surfaces.

Reference Numeral 4 denotes a lens barrel for holding an image taking lens or the like, and it is moved in the optical axis direction to change the focal length of an image taking optical system. An object image formed by the image taking optical system is photoelectrically converted by an image pickup element 45 such as a CCD sensor, a CMOS sensor or the like. Image data output from the image pickup element 45 are subjected to image processing (color processing, etc.) in an image processing circuit, and then recorded in a recording medium mounted in the camera or output to an LCD panel 26 described later to be displayed as an object image.

The lens barrel 4 is disposed so as to be leaning to the right side with respect to the camera body. Here, a hole portion 1b for allowing the operation of the lens barrel 4 is formed in the front cover 1.

Reference Numeral 5 denotes a strap ring to which a strap 51 is secured, and it is equipped at the left side of the front cover 1 when viewing the front side of the camera.

Speaker hole portions 1a and 2a are formed in the front cover 1 and the rear cover 2, and some of the speaker hole portions 1a and 2a penetrate through the covers 1 and 2, and the other hole portions are formed so as to project to the insides of the covers 1 and 2.

Reference Numeral 6 denotes a base member, and holds various kinds of parts disposed in the camera. Reference Numeral 7 denotes a battery holding member, and holds a battery 8 inserted in the camera. Here, a space (battery case) in which the battery 8 is accommodated is formed by the battery holding member 7 and the base member 6.

A lid unit 11 constructed by a lid member 9 and a lid slide member 10 is rotatably secured via shafts 11a and 11b to the end portion of the battery holding member 7. That is, when the battery 8 is mounted in the battery case, the lid slider member 10 is first slid in a predetermined direction, and the lid member 9 is rotated with the shafts 11a and 11b as rotational axes, whereby an opening portion of the batter case can be opened. Under this state, the battery 8 is accommodated in the battery case, and the mounting operation of the battery 8 is finished by closing the lid unit 11.

A operating flexible board 12 and a speaker 13 for emitting specific sounds (for example, an operating sound, voices in a moving-picture pickup operation) are disposed at the upper portion of the battery holding member 7. A release switch 12a for starting an image taking standby operation (a focusing adjusting operation of the image taking optical system, a light metering operation, etc.) and an image taking operation (recording of image data read out from the image pickup element 45), and a power switch 12b for turning on/off the power of the camera are mounted on the operating flexible board 12.

At the upper side of the speaker 13 are disposed a buffer member 14 having elasticity such as urethane foam or the like, and a water-repellant sheet 15 for preventing water immersion from the outside of the camera to the speaker 13. The buffer member 14 and the water-repellant sheet 15 are fixed to the battery holding member 7 by a speaker holding member 16.

A release button 18 and a power supply button 19 are held via a spring member (not shown) by a button holding member 17. The button holding member 17 is fixed to the upper portion of the operating flexible board 12 by an arm portion 6a of the base member 6 and the speaker holding member 16.

Reference Numeral 20 denotes a contact piece holding member for holding contact pieces 8a to 8c of the battery 8, and a pawl portion formed in the contact piece holding member 20 is engaged with the battery holding member 7, whereby the contact piece holding member 20 is fixed to the battery holding member 7.

Reference Numeral 21 denotes an electric flash holding member, and holds a light emitting unit 21a for irradiating illumination light to an object, and a capacitor 24 which is disposed at the back side of the light emitting unit 21a and accumulates energy when the illumination light is irradiated. The electrical flash holding member 21 is fixed to the base member 6.

A flexible board 22 on which an electrical flash circuit and a power supply circuit are mounted is fixed to an area of the electrical flash holding member 21 which extends from the light emitting unit 21a to the lower side of the camera. The flexible board 22 is disposed in the front-and-rear direction of the camera with respect to the electric flash holding member 21, and it comprises board portions on which various kinds of electrical parts are mounted, and a flexible portion for linking these board portions. A flexible protecting member 23 is disposed so as to cover the flexible portion of the flexible board 22.

On the other hand, the board portion located at the front side of the camera out of the board portions of the flexible board 22 is connected to the contact pieces of the battery 8 held by the contact piece holding member 20 at this one end, and directly supplies power from the battery 8 to the power supply circuit. A partial area 23a of the flexible protecting member 23 has spring performance, and it comes into contact with the side cover 3 so as to bias the side cover 3 when it is assembled to the side cover 3. Accordingly, the flexible protecting member 23 plays the role of protecting flexible board 22 without transferring to the flexible board 22 any impact applied from the outside of the camera to the side cover 3.

Reference Numeral 25 denotes an LCD holder for holding an LCD panel 26 and a back light (not shown) for LCD display, and it is fixed to the base member 6 by a hook portion 25a and a screw (not shown). The LCD panel 26 is connected to a control circuit mounted on a main board 27 described later via a flexible print wire board 26a, and displays data such as image taking information or image taking images on the basis of an output from the control circuit.

A projecting portion 25b formed at one end of the LCD holder 25 has spring performance, and is brought into contact with the rear cover 2. Accordingly, electrical conduction between the rear cover 2 and the base member 6 is secured.

Here, a hole portion 2b through which the LCD panel 26 is exposed to the outside of the camera is formed in the rear cover 2.

Reference Numeral 27 denotes a main board on which the control circuit, the image processing circuit, etc., of the camera are mounted. It is fixed to the base member 6 by screws 28a and 28b and also fixed to the electrical flash holding member 21 together with the flexible protecting member 23 by a screw 28c. Accordingly, the electrical conduction between the main board 27 and the side cover 3 is secured via the flexible protecting member 23.

Reference Numeral 29 denotes a mode switching button, and the operation mode of the camera can be switched by sliding the mode switching button 29 in the right and left direction of the camera body. Specifically, mode selection of a still picture image taking mode (REC MODE), a moving picture image taking mode (MOVIE MODE) and a reproducing mode (PLAY MODE) can be carried out.

The mode switching button 29 is slidably secured to the rear cover 2 by a securing member 30, and a mode contact piece 31 is fixed to a portion of the mode switching button 29 which is located inside the rear cover 2.

The mode contact piece 31 is designed so as to come into contact with a conduction pattern 12c formed on the operating flexible board 12, and it slides on the conduction pattern 12c in accordance with the operation of the mode switching mode button 29 to thereby output a predetermined signal. The output signal is transmitted to the control circuit on the main board 27, and the control circuit switches the operation mode of the camera in accordance with the signal thus input.

Reference Numeral 32 denotes a tripod securing member disposed on the lower surface of the camera body, and it has a screw hole portion which is engaged to a screw secured to a tripod (not shown). The tripod securing member 32 is fixed to the base member 6 by screws 32a and 32b.

Reference Numerals 33, 34a and 34b denote operating buttons, attached to an operating button base member 35. The operating button 33 comprises a so-called cross button, and by operating the cross button, information displayed on the LCD panel 26 can be switched in the up-and-down and right-and-left direction. Here, plural hole portions 2c for exposing the operating buttons 33, 34a and 34b to the outside of the camera are formed in the rear cover 2.

A conduction member is attached to the areas of the operating button base member 35 which correspond to the operating buttons 33, 34a, 34b, and by pressing the operating buttons 33, 34a, 34b, the conduction members are brought into contact with the pattern on the operating flexible board 12, thereby establishing electrical conduction. This signal is input to the control circuit and the control circuit carries out the operation corresponding to the input signal.

The operating flexible board 12 and the operating button base member 35 are positioned by a boss (not shown) equipped to the base member 6 so that the relative positions thereof are not displaced from each other.

Reference Numeral 36 denotes a jack board, and a jack and a USB connector for communicating images and voices with external equipment (for example, a PC, a printer and TV) (not shown).

Next, the process in which the structure unit constructed by securing the various kinds of members described above to the base member 6 is covered by the front cover 1, the rear cover 2 and the side cover 3 to thereby fabricate a camera will be described with reference to FIG. 4.

After the positional adjustment of the various kinds of members fixed to the base member 6 is carried out, the front cover 1 and the rear cover 2 are secured. Specifically, the camera front side of the structure unit 50 is covered by the front cover 1, and the front cover 1 is fixed to the base member 6 by a screw 37. At this time, the projecting portions projecting to the inside of the front cover 1 out of the speaker hole portions 1a of the front cover 1 are hooked to the edge 16a of the hole portion formed in the speaker holding member 16.

Furthermore, a hole portion 1c through which the light emitting unit 21a penetrates is formed in the front cover 1, and the front surface of the light emitting unit 21a is exposed to the front surface of the front cover 1 while the front cover 1 is secured to the structure unit 50. Here, an area of the front surface of the light emitting unit 21a at the lower side of the camera is constructed by a surface continuous with the surface of the front cover 1, and an area of the front surface of the light emitting unit 21a at the upper side of the camera is designed to project from the surface of the front cover 1.

Subsequently, the camera back side of the structure unit 50 is covered by the rear cover 2, and the rear cover 2 is fixed to the base member 6 by a screw 38. At this time, the projecting portions projecting to the inside of the rear cover 2 out of the speaker hole portions 2a of the rear cover 2 are hooked to the edge 16b of the hole portion formed in the speaker holding member 16.

As described above, the projecting portions formed in the front cover 1 and the rear cover 2 are hooked to the hole portion of the structure unit 50 (the hole portion of the speaker holding member 16), whereby the front cover 1 and the rear cover 2 can be prevented from being opened in the front-and-rear direction of the camera body (thickness direction).

Furthermore, since the speaker holding member 16 is lifted to the upper side of the camera by the buffer member 14, so that it is brought into close contact with the covers 1 and 2, the projecting portions of the covers 1 and 2 are hardly detached from the speaker holding member 16.

After the front cover 1 and the rear cover 2 are assembled with the structure unit 50, the side cover 3 is mounted on the covers 1 and 2 by sliding the side cover 3 from the light emitting unit 21a side in the lateral direction of the camera body.

Here, pawl portions 3a and 3b are formed at one end of the side cover 3, and the pawl portions 3a and 3b are made to abut against the insides of engaged portions 1d and 2d formed in the front cover 1 and the rear cover 2 respectively, whereby one end side of the side cover 3 can be prevented from being floated with respect to the covers 1 and 2.

Furthermore, the side cover 3 and the covers 1 and 2 are designed so that the surfaces of the side cover 3 and the covers 1 and 2 which are located on the upper surface of the camera body are continuous with one another while the pawl portions 3a and 3b are engaged with the engaged portions 1d and 2d. Accordingly, as compared with a case where the side cover 3 and the covers 1 and 2 are fixed to each other by screws or the like, the appearance quality of the camera can be further enhanced.

Under the state where the side cover 3 is assembled with the covers 1, 2, a screw 39 is screwed in from the side surface side of the camera body, and also screws 40a and 40b are screwed in from the lower surface side of the camera body, whereby the side cover 3 is fixed to the covers 1 and 2. Through this operation, the assembly of the camera is finished.

Figure 4:
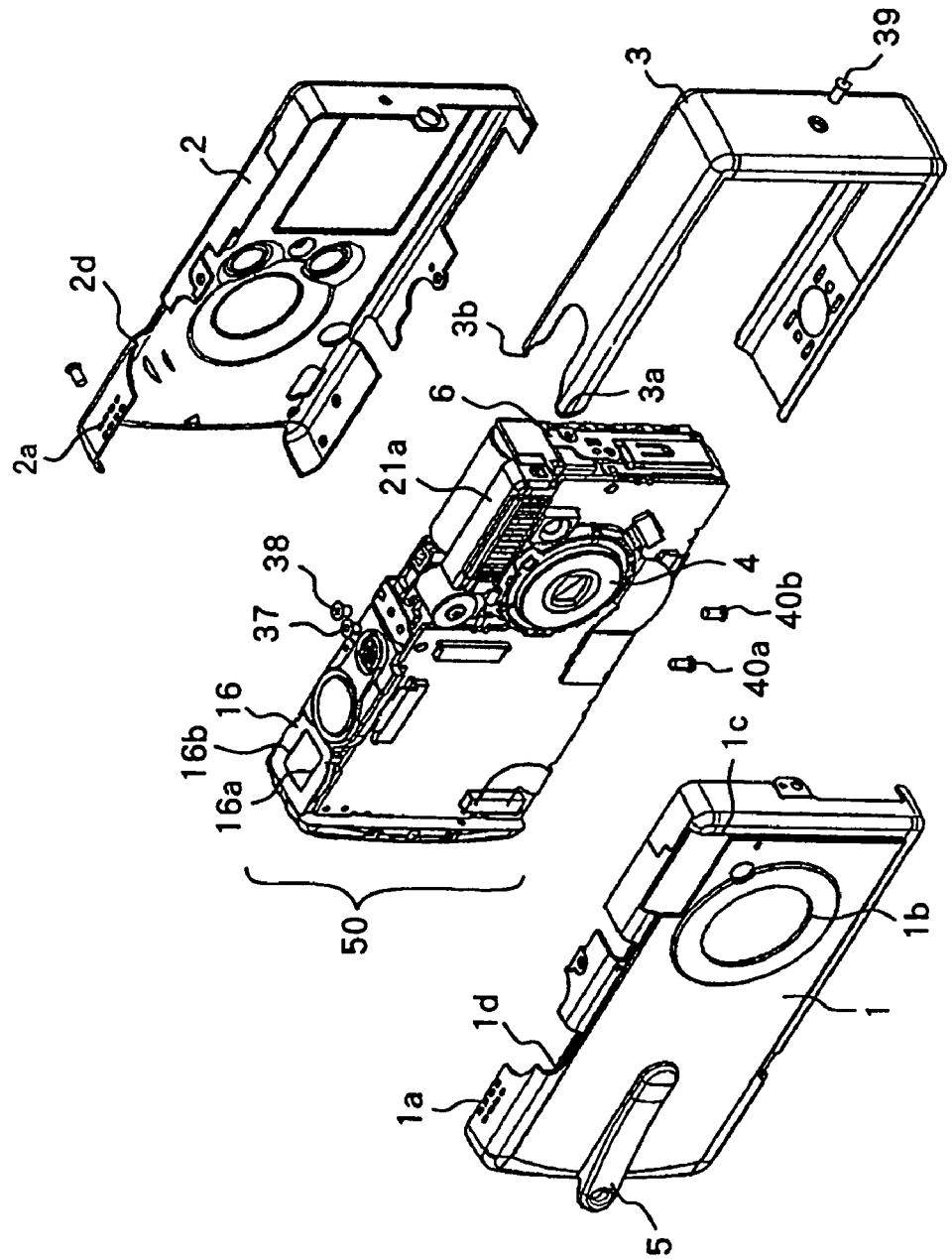
FIG. 4 is an exploded view of the camera of the first embodiment of the present invention.

The side cover 3 is shaped as shown in FIG. 4 by inwardly bending side edges of a planar member extending in one direction (side edges extending in the longitudinal direction) to form a substantially overturned U-shape, and then bending the result at two places in the longitudinal direction to form a substantially overturned U-shape.

The side cover 3 thus shaped is assembled with the covers 1 and 2, whereby parts of the upper surface and lower surface of the camera body and one side surface of the camera body can be covered, and thus the covers 1 and 2 can be enforced. That is, the side cover 3 covers the mated portions of the front cover 1 and rear cover 2, whereby the mated portions of the covers 1 and 2 can be repressed from being opened due to an impact when the camera falls.

In the camera of this embodiment, since the members constituting the camera which are disposed in the covers 1, 2, for example, the lens barrel 4 and the light emitting unit 21a are disposed so as to be leaning from the center of the camera body to the right side, the center of gravity of the camera is deviated to the right side of the camera body. Therefore, when the camera falls, the camera may fall to the ground surface or the like from a side of the camera which is near to the center of gravity of the camera. Furthermore, when a strap is released from a hand under the state where the strap is secured to a strap ring 5 and a camera is held through the strap, the camera strikes against the ground surface or the like from the right side surface of the camera.

In this embodiment, the side cover 3 is equipped so as to be located at a near position to the center of gravity of the camera. Therefore, when the camera falls, an impact to be imposed on the camera is suppressed by the side cover 3, so that the mated portions of the front cover 1 and the rear cover 2 can be prevented from being opened or the light emitting unit 21a can be prevented from being damaged.

In addition, the side cover 3 also covers the bent portions of the front cover 1 and the rear cover 2 (the end portions of the camera), so that an impact imposed on these portions can be suppressed.

Figure 5A:
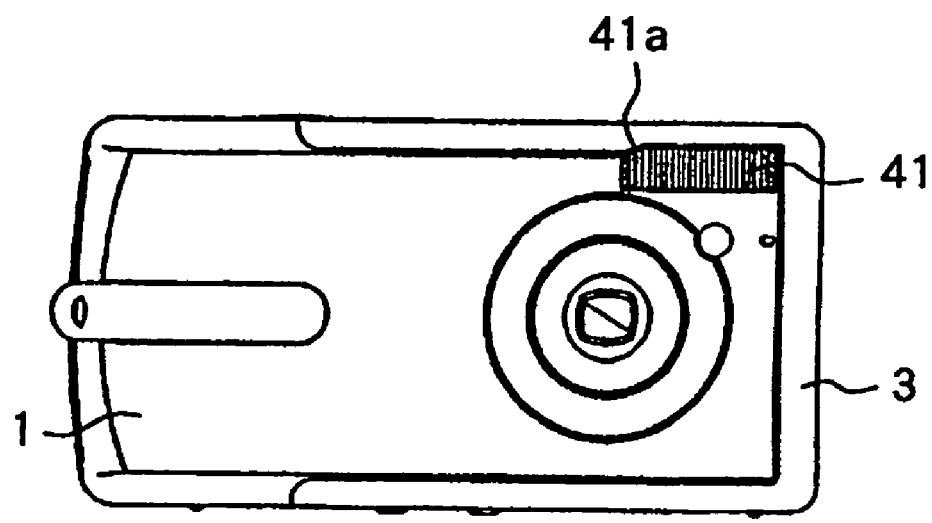
FIGS. 5A and 5B are diagrams showing attaching/detaching of a side cover of the camera of the first embodiment according to the present invention.
Figure 5B:
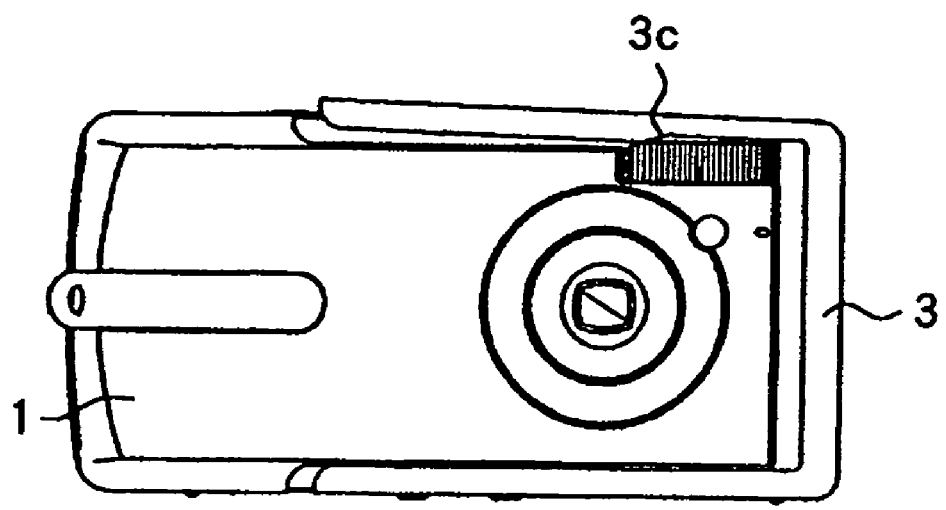

FIG. 5 is a front view showing the camera according to this embodiment, wherein FIG. 5A shows a state under which the side cover 3 is mounted on the covers 1 and 2, and FIG. 5B shows a state under which the side cover 3 is detached from the covers 1 and 2.

In FIG. 5A, Reference Numeral 41 denotes a prism panel disposed on the front surface of the light emitting unit 21a, and adjusts an irradiation angle of illumination light exited from the light emitting unit 21a. An area of the prism panel 41 at the lower side of the camera (the lower side of FIG. 5A) is constructed by a surface continuous with the surface of the front cover 1, and an area of the prism panel 41 at the upper side of the camera (the upper side of FIG. 5A) is constructed by a surface continuous with the surface of the side cover 3.

A slant portion 41a is formed at a part of the prism panel 41, and also a slant portion 3c is formed at the area corresponding to the slant portion 41a of the side cover 3. Under the state where the side cover 3 is mounted on the covers 1 and 2 (FIG. 5A), the slant portion 41a abuts against the slant portion 3c.

Here, when the side cover 3 is detached from the covers 1 and 2, it is first required to slide the side cover 3 in the lateral direction of the camera body until the pawl portions 3a and 3b of the side cover 3 are disengaged from the engaged portions 1d and 2d. At this time, the slant portion 3c of the side cover 3 moves along the slant portion 41a of the prism panel 41, and the side cover 3 can be detached while deforming the side cover 3.

Here, when the slant portions 3c and 41a are not formed in the side cover 3 and the prism panel 41, that is, when the areas corresponding to the slant portions 3c and 41a are formed substantially at right angles, the prism panel 41 may be damaged by the side cover 3 when the side cover 3 is detached while slid in the right-and-left direction of the camera.

However, according to this embodiment, the slant portion 3c is equipped to the side cover 3 while the slant portion 41a is also equipped to the prism panel 41. Therefore, when the side cover 3 is detached from the covers 1 and 2, the slant portion 3c of the side cover 3 is moved along the slant portion 41a of the prism panel 41, whereby the side cover 3 can be prevented from being hooked to the prism panel 41 and thus damaging the prism panel 41. Accordingly, the side cover 3 can be easily detached from the camera body.

When the side cover 3 is mounted on the covers 1 and 2, the side cover 3 is made to merely abut against the end portion of the prism panel 41, so that the prism panel 41 is not damaged.

In the above-described embodiment, a description has been given regarding a camera. However, the present invention may be applied to other electronic apparatus, for example, portable electronic apparatus such as a mobile phone or the like. Furthermore, the camera of the above-described embodiment has the front cover 1 and the rear cover 2, however, these covers may be integrally formed with each other. In this case, the side cover 3 is mounted on the cover thus integrally formed.

While preferred embodiments have been described, it is to be understood that modification and variation of the present invention may be made without departing from the scope of the following claims.

This application claims priority from Japanese Patent Application No. 2003-319997 filed on Sep. 11, 2003, which is hereby incorporated by reference herein.

What is claimed is:

1. A camera comprising:

an inner assembly which has a plurality of camera components, the camera components including (a) an image-pickup element, (b) a lens arranged on a front face of the inner assembly and providing an image of an object on the image-pickup element and (c) a display device arranged on a rear face of the inner assembly, wherein the image-pickup element, the lens and the display device are arranged so as to be deviated toward a first side face of the inner assembly, and the center of gravity of the inner assembly is closer to the first side face than a second side face of the inner assembly, the second side face being located on an opposite side from the first side face;

a first exterior member which covers the front face of the inner assembly and a part of each of a top face, a bottom face and the first side face of the inner assembly;

a second exterior member which covers the rear face of the inner assembly and an another part of each of the top face, the bottom face and the first side face of the inner assembly; and a third exterior member which extends along the top face, the bottom face and the first side face of the inner assembly to cover mated portions of the first and second exterior members, and does not cover the second side face of the inner assembly, wherein the first, second and third exterior members form an exterior of the camera.

2. A camera comprising:

an inner assembly which has a plurality of camera components, the camera components including (a) an image-pickup element and (b) a lens arranged on a front face of the inner assembly and providing an image of an object on the image-pickup element, the inner assembly having a first side face and a second side face located on an opposite side from the first side face;

a fitting member which is used for fixing a strap to the camera;

a first exterior member which covers the front face of the inner assembly and a part of each of a top face, a bottom face and the first side face of the inner assembly, wherein the fitting member is provided at one side end of a front face of the first exterior member, the one side end being closer to the second side face of the inner assembly than the first side face thereof;

a second exterior member which covers a rear face of the inner assembly and another part of each of the top face, the bottom face and the first side face of the inner assembly; and a third exterior member which extends along the top face, the bottom face and the first side face of the inner assembly to cover mated portions of the first and second exterior members, and does not cover the second side face of the inner assembly, wherein the first, second and third exterior members form an exterior of the camera.

* * * * *